June 21, 1966   S. G. HARDY ETAL   3,257,591
PLUG TYPE PROBE FOR CAPACITIVELY MEASURING SURFACE
FLATNESS SURROUNDING CIRCULAR HOLE IN METAL PLATE
Filed Sept. 12, 1962                             2 Sheets-Sheet 1
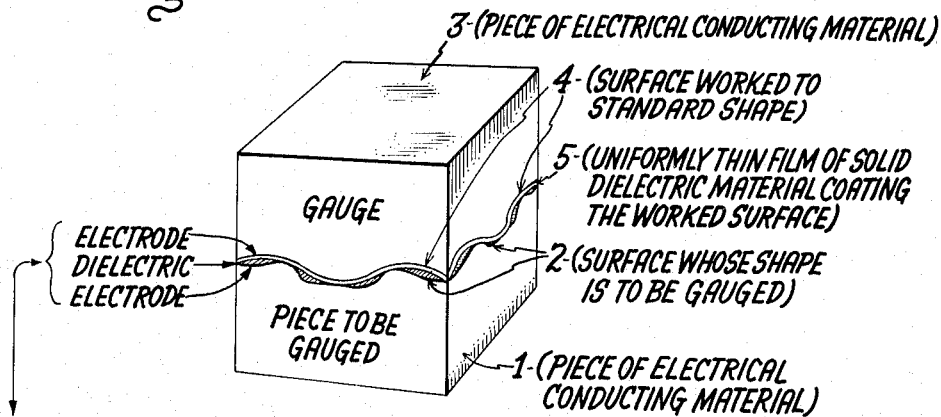
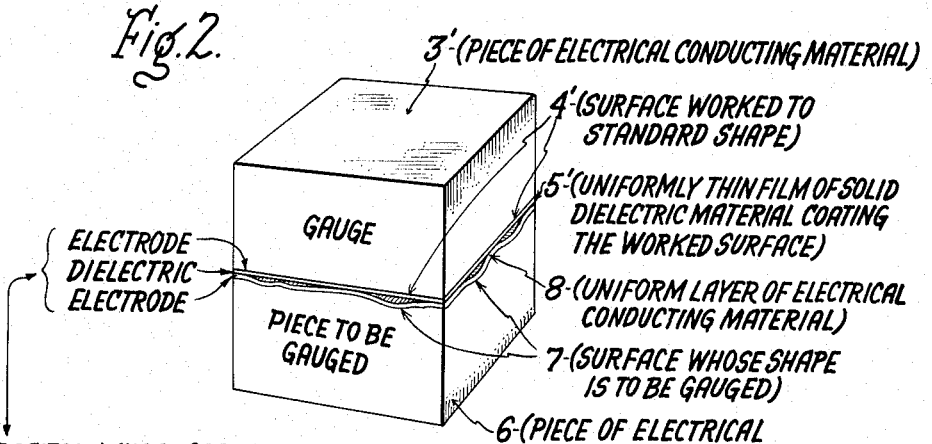
Inventors,
Samuel G. Hardy,
James R. Barr,
by Gilbert P. Tarleton
Their Attorney.

June 21, 1966 S. G. HARDY ETAL 3,257,591
PLUG TYPE PROBE FOR CAPACITIVELY MEASURING SURFACE
FLATNESS SURROUNDING CIRCULAR HOLE IN METAL PLATE
Filed Sept. 12, 1962 2 Sheets-Sheet 2
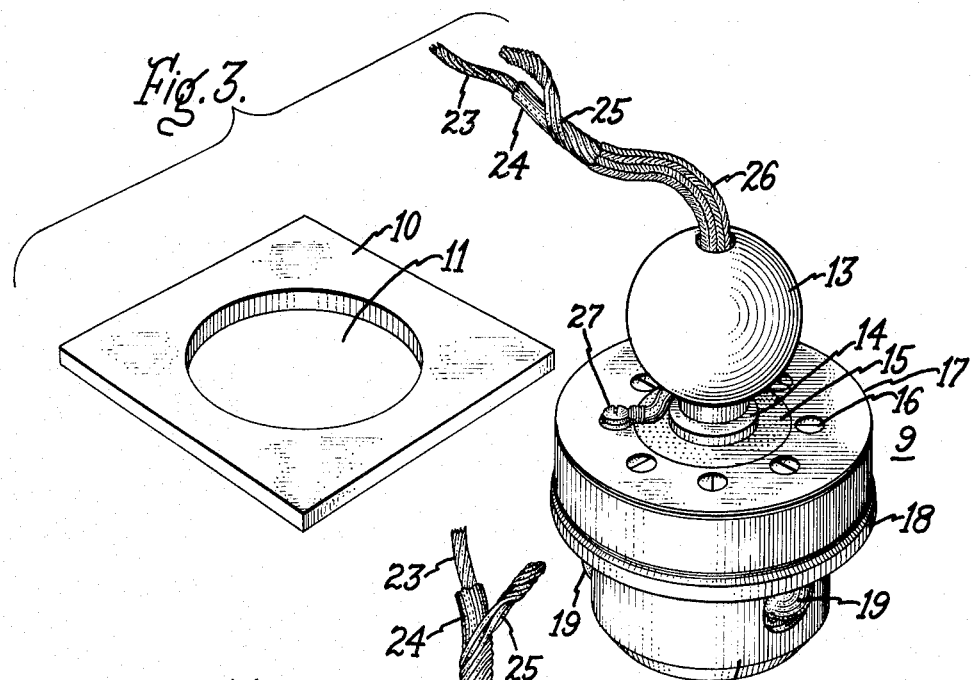
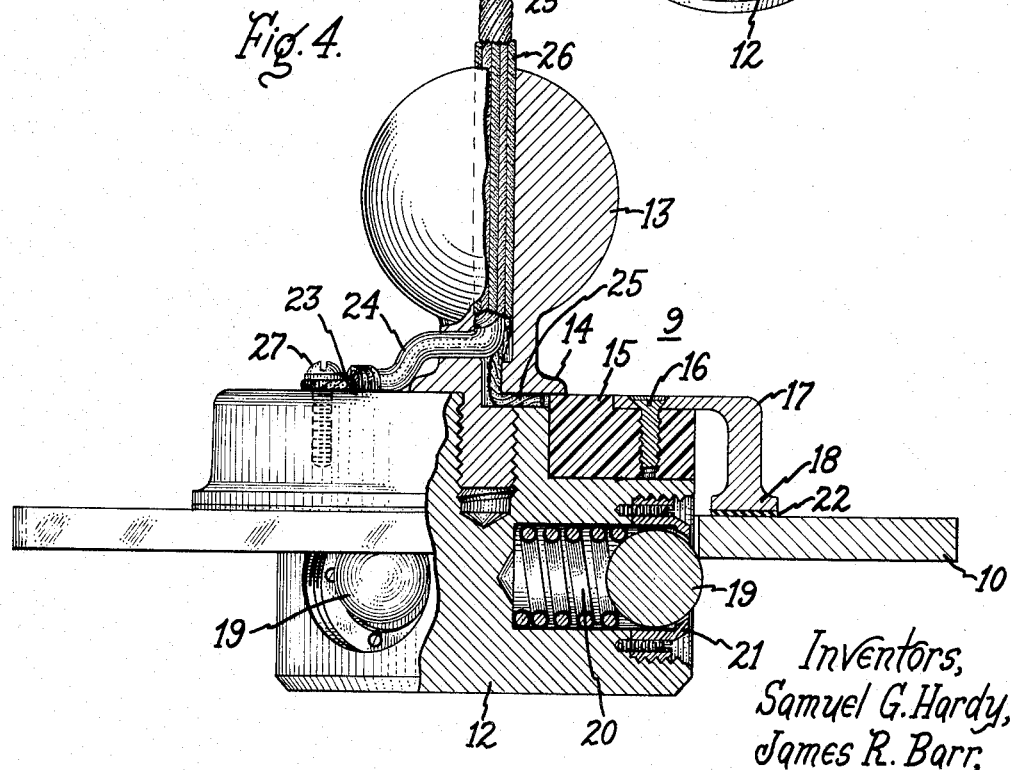
Inventors,
Samuel G. Hardy,
James R. Barr,
by Gilbert P. Tarleton
Their Attorney.

United States Patent Office 3,257,591
Patented June 21, 1966

3,257,591
PLUG TYPE PROBE FOR CAPACITIVELY MEASURING SURFACE FLATNESS SURROUNDING CIRCULAR HOLE IN METAL PLATE
Samuel G. Hardy and James R. Barr, Rome, Ga., assignors to General Electric Company, a corporation of New York
Filed Sept. 12, 1962, Ser. No. 223,165
1 Claim. (Cl. 317—246)

This invention relates to capactive shape gauging and more particularly to an improved method and apparatus for capacitively gauging the shape of a surface of a solid object.

Broadly speaking, the invention comprises using the electrostatic capacity between conductive gauge and gauged surfaces separated by a solid dielectric material as a measure of the degree of conformity of the shape of the gauged surface to a standard shape of a gauge surface.

An object of the invention is to provide a new and improved method and apparatus for gauging the shape of a solid surface.

The invention will be better understood from the following description taken in connection with the accompanying drawings and its scope will be pointed out in the appended claim.

In the drawings,

FIG. 1 is a schematic illustration of the invention in its broader aspects.

FIG. 2 is a modification of FIG. 1 in which the gauge surface is flat rather than contoured as in FIG. 1 and the primary gauged surface is an electrical insulating surface rather than an electrical conducting surface as in FIG. 1.

FIG. 3 is an isometric view of a particular embodiment of the invention for gauging the flatness of a surface surrounding an opening in a metal plate or wall, and FIG. 4 is an enlarged side elevation view partly broken away and sectionalized showing the embodiment of FIG. 1 in operative relation to the surface to be gauged.

Referring now to the drawings and more particularly to FIG. 1, there is shown therein a piece or block of electrical conducting material 1 such as metal having a contoured surface 2 whose shape is to be gauged. For gauging the shape of the surface 2, there is provided a gauge 3 in the form of a piece of electrical conducting material having a surface 4 worked to a standard shape by any suitable technique such as on a shaper or milling machine or by grinding.

The gauge surface 4 is coated with a uniformly thin film 5 of solid dielectric material. Such film can be a hardened or cured polyvinyl formal enamel such as is used for insulating wire or other conductors in accordance with the teachings of United States Patent 2,307,588 granted on an application of Edward H. Jackson et al. and assigned to the present assignee.

Another suitable form of coating is sprayed and sintered polytetrafluoroethylene (TFE) or fluorinated ethylene propylene (FEP), available commercially under the Du Pont brand name Teflon®. However, it is not essential that the film coating be bonded to the gauge surface and a loose film of dielectric sheet material can be used as the coating.

The film coating should be of uniform thinness preferably within the range of .002″–.004″ and it should have the properties of durability, abrasion resistance, low dielectric constant, low moisture absorption, and low power factor. The reason for low dielectric constant is to increase the sensitivity of the gauge by making the variations in capacitance due to variations in conformity of the gauge and gauged surfaces a greater proportion of the total capacitance of the device.

By placing the coated gauge surface against the surface to be gauged, a capacitor or electrostatic condenser is formed whose dielectric is the film coating and whose electrodes are the gauge surface which has been worked to standard shape and the surface whose shape is to be gauged. Preferably the surface to be gauged is coextensive with or larger than the test surface of the gauge. As the capacitance of such a capacitor will be a maximum when the surface whose shape is to be gauged conforms exactly in contour to the test surface which has been worked to standard shape, any departure or deviation from this exact conformity will result in a decrease in capacitance due to an increase in average spacing between the capacitor electrodes and/or to air or other material having a different dielectric constant than that of the film coating entering the spaces caused by irregularities in the surface whose shape is to be gauged. In other words, the working dielectric for any practical measurement is a combination of the solid film plus the air or other fluid occupying the voids due to misfit of the gauged surface to the gauge surface. Therefore, the capacitance of this capacitor, or perhaps more accurately the decrease in its capacitance from its maximum possible value, will be a measure of the degree of conformance or non-conformance of the gauge and gauged surfaces.

The actual measurement of capacitance either as an absolute measurement or as a comparative measurement can be performed in many different well-known ways which are equivalent so far as the principle of this invention is concerned. For example, the amount of electricity in ampere-seconds or coulombs stored in the capacitor divided by the voltage between its electrodes will be equal to its capacitance. Another way to measure the capacitance of the capacitor would be to force electricity into the capacitor at a given rate, i.e., as measured in amperes, and measure the rate of change of voltage difference between the electrodes, the ratio of amperes to the time rate of change of the voltage also being equal to the capacitance of the capacitor. Still another way would be to use an ordinary commercially available capacitance measuring bridge in which the capacitor of FIG. 1 would be inserted in one of the arms of the bridge which when adjusted to balance would measure the capacitance of the capacitor. A still further way of measuring the capacitance would be to connect it to a resonant circuit which could be so adjusted or proportioned that the circuit would be resonant when the capacitor had its maximum value corresponding to exact conformance of the gauge and gauged surfaces. As resonant circuits are highly critical, a small percentage change in capacitance represented by a small degree of non-conformance of the gauge and gauged surface shapes would be reflected in comparatively large percentage changes in the condition of the circuit.

Experience has shown that gauging in accordance with the present invention is capable of resolution in the order of .001″.

FIG. 2 differs from FIG. 1 in that the piece to be gauged is a piece 6 of electrical insulating material and the surface 7 of the piece 6 whose shape is to be gauged is flat rather than contoured and is provided with a uniform layer 8 of electrical conducting material. Such a layer may be chemically or electrolytically or electrostatically deposited or precipitated on the contoured insulating surface, or it may be sprayed on in the form of molten metal droplets. Alternately it may be brushed or sprayed on as a liquid such as conductive silver paint.

The principle of operation of FIG. 2 is essentially the same as for FIG. 1, the electrodes of the capacitor being the worked or contoured gauge surface and the conducting layer which conforms to the shape of the insulating surface whose shape is to be gauged, the dielectric being the same as in FIG. 1.

Referring now to FIG. 3, there is shown therein another embodiment of the invention consisting of a probe 9 for gauging the degree of flatness of the nomially flat surface of a metal plate or wall 10 surrounding a hole 11 therein. This, for example, could be a hole in a transformer tank to which an auxiliary device is to be attached by means of a gasketed joint.

FIG. 4 shows the probe 9 in operative relation to the plate 10. The probe 9 comprises a cylindrical metallic element or member 12 corresponding generally in outward configuration to the shape of the hole 11 but being slightly smaller so that it can be readily inserted therein. Threaded to the top of the cylindrical main body 12 is an operating handle 13 of any suitable shape. Clamped between a flange 14 on the handle 13 and the body portion 12 is a ring of solid electrical insulation 15 seated in a circular recess in the top of the body portion 12. Attached by means of screws 16 to the block of insulation 15 is a circular dish or cup-shaped metal or other electrical conducting member 17 having a widened or flared rim 18. As will be seen, the circular ring of insulation 15 and the circular cup-shaped metal member 17 are both concentrically mounted with respect to the axis of the cylindrical member 12.

For centering and temporarily retaining the probe or cylindrical portion 12 thereof in the opening 11 of the plate 10, and for making an electrical connection or contact with plate 10, the member 12 is provided with three spring-loaded balls 19 mounted in coplanar relationship and symmetrically angularly displaced from each other and at right angles to the axis of the member 12. As shown, these balls fit into radially extending holes drilled in the member 12 in each of which is a coiled compression spring 20, the balls being retained in place by means of retaining rings 21 threaded into the body portion 12.

As shown in FIG. 4, the arrangement is such that the balls are pressed inwardly slightly away from the seats of their retaining rings 21 so as to clamp the probe in center position in the hole 11 and with the rim 18 of the member 17 pressed against the surface of the plate 10 surrounding the hole 11.

The surface of the enlarged or flared rim 18 is coated with a uniformly thin film of dielectric material 22 after it has been accurately worked flat in any suitable manner so as to constitute a guage surface for gauging the flatness of the surface of the plate 10 surrounding the hole 11.

Electrical connections are made to the probe by means of a shielded cable of a type readily available commercially on the market. It may comprise a shielded inner stranded conductor 23, a polyethylene low loss insulation sheath 24, surrounded by a braided shielding outer conductor 25 and a polyethylene outer sheath 26. The shielded cable 23 passes through an axial hole in the handle 13, the shielding outer conductor 25 being in effect grounded by being clamped between the flange 14 on the handle 13 and the main metal body portion 12, the shielded inner conductor 23 being connected to the cup-shaped metal member 17 by means of a terminal screw 27.

In the operation of the embodiment shown in FIGS. 3-4, capacitance as measured between the conductors 23 and 25 of the shielded cable will be substantially a predetermined constant tare value determined primarily by the shielded cable design and length, plus a variable capacitance value between the electrode comprising the flat-worked gauge surface of 18 and the electrode comprising the surface of the plate 10 which is in contact with the insulating film 22, the electrical connection to the plate 10, of course, being made through the shielding conductor 25, the main body portion 12, and the spring loaded balls 19 which are pressed against the metal plate 10.

While there have been shown and described particular embodiments of the invention, it will be obvious to those skilled in the art that changes and modifications may be made without departing from the invention, and therefore it is intended by the appended claim to cover all such changes and modifications as fall within the true spirit and scope of the invention.

What we claim as new and desire to secure by Letters Patent of the United States is:

A plug type probe for use in capacitively measuring the surface flatness surrounding an end of a circular hole in a plate metal wall comprising, in combination, a plug electrode having a cylindrical portion for entering said hole and a handle on its outer end, three spring loaded metal balls radially recessed in said cylindrical portion in coplanar angularly symmetrical relation about its axis for centering and temporarily retaining said cylindrical portion said hole, a ring of solid insulation concentrically mounted on said plug electrode and clamped between said cylindrical portion and said handle, a ring electrode concentrically mounted on said ring of solid insulation and having a machined flat annular shaped surface radially spaced from and concentric with said plug portion in a radial plane between the plane of said balls and said handle, a film of uniformly thin solid dielectric material on said machined flat surface, and a flexible shielded cable passing through said handle, said cable having a shielded conductor connected to said ring electrode and a shielding conductor connected to said plug.

References Cited by the Examiner

UNITED STATES PATENTS

| | | | |
|---|---|---|---|
| 1,886,508 | 11/1932 | Wierk | 324—61 X |
| 1,924,087 | 8/1933 | Allen | 324—61 |
| 2,307,588 | 1/1943 | Jackson et al. | 117—232 |
| 2,399,582 | 4/1946 | Stevens | 324—61 X |
| 2,417,062 | 3/1947 | Coake | 324—61 |
| 2,417,988 | 3/1947 | Mooney | 73—37 |
| 2,512,372 | 6/1950 | Pahala | 324—61 X |
| 2,618,965 | 11/1952 | Gray | 73—37 |
| 2,718,620 | 9/1955 | Howe | 324—61 |
| 2,794,953 | 6/1957 | Callender | 324—61 |
| 2,849,675 | 8/1958 | Hall et al. | 324—61 |
| 2,935,681 | 5/1960 | Anderson | 324—61 |
| 3,009,100 | 11/1961 | Muchnick | 324—65 X |
| 3,020,033 | 2/1962 | McCreanor | 324—37 X |

FOREIGN PATENTS

| | | |
|---|---|---|
| 738,124 | 8/1943 | Germany. |
| 819,533 | 9/1959 | Great Britain. |

OTHER REFERENCES

Cruft Electronics Staff: "Electronic Circuits and Tubes," McGraw-Hill Book Co., New York, 1947, page 66.

WALTER L. CARLSON, *Primary Examiner.*

C. A. S. HAMRICK, W. H. BUCKLER,
*Assistant Examiners.*